J. O. CALDWELL, Jr.
TIRE PROTECTOR.
APPLICATION FILED MAR. 19, 1910.
1,012,325.
Patented Dec. 19, 1911.
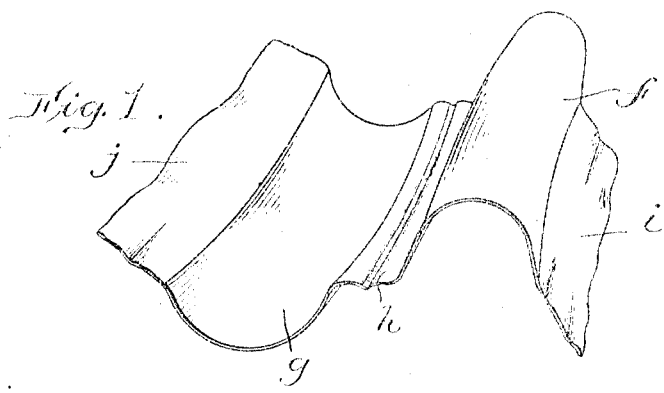
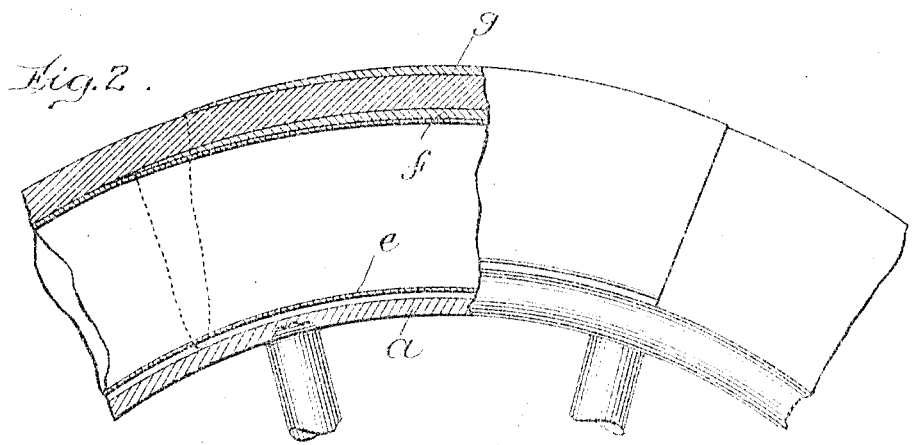
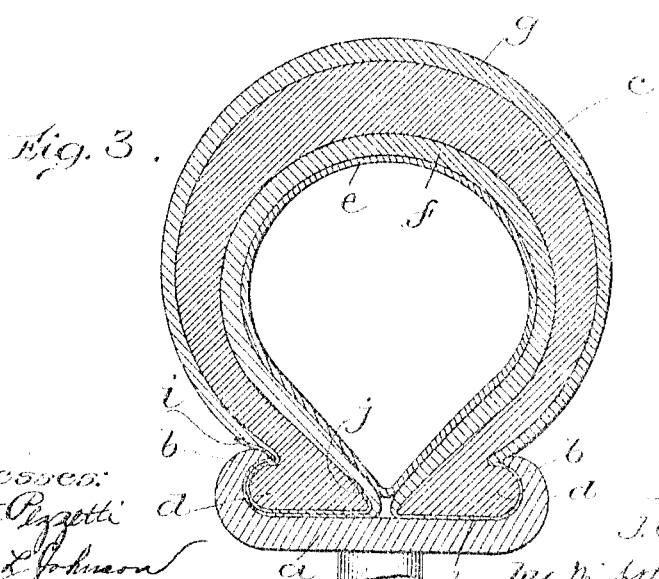

UNITED STATES PATENT OFFICE.

JOHN O. CALDWELL, JR., OF BOSTON, MASSACHUSETTS, ASSIGNOR OF ONE-HALF TO JOHN O. CALDWELL, SR., OF BOSTON, MASSACHUSETTS.

TIRE-PROTECTOR.

1,012,325. Specification of Letters Patent. Patented Dec. 19, 1911.

Application filed March 19, 1910. Serial No. 550,446.

*To all whom it may concern:*

Be it known that I, JOHN O. CALDWELL, Jr., of Boston, in the county of Suffolk and State of Massachusetts, have invented certain new and useful Improvements in Tire-Protectors, of which the following is a specification.

This invention relates to a protector or shield intended for use in mending the shoes for pneumatic tires, or of strengthening a weakened part of the tire shoe.

The invention is particularly designed for automobile tires in which an outer shoe incloses an air-tight inner tube.

The object is to enable blow-outs or rim cuts in tire shoes to be repaired quickly, without necessity of vulcanization, and also to reinforce a weakened part of the tire.

I accomplish my object by providing a protector or sleeve which is designed to surround the injured or weakened part of the shoe. It is provided with a member adapted to lie inside of the shoe, fitting the inner curvature thereof, and a member adapted to lie outside and fit the external curvature or formation of the shoe, whereby the entire extent of the injured part of the shoe is wrapped about and covered by the protector.

In the accompanying drawings, I have illustrated the manner in which the invention is to be carried into effect, showing the preferred form of device in which I have embodied the principles of the invention.

Figure 1 represents a perspective view of the device ready to be applied to the tire. Fig. 2 represents a partial section of a wheel and tire, showing my protecting device applied thereto. Fig. 3 represents a cross-section of the wheel rim and tire with the protector applied thereto, showing the parts on an enlarged scale.

The same reference characters indicate the same parts in all the figures.

Referring to the drawings, *a* represents the rim of a wheel having the inturned flanges *b* to engage the locking beads of a tire shoe.

*c* represents a tire shoe of any common sort, such as is known as the clencher tire, having beads *d* which catch under the flanges of the rim when the tire is applied thereto.

*e* represents the inner tube of air-tight material which is contained within the outer shoe.

The commonest accidents to which the outer shoes of tires, particularly those used for motor vehicles, are subject, are blow-outs or rim cuts, and the device constituting my present invention is designed to repair both classes of accidents. This device consists essentially of a member *f* curved longitudinally and transversely to fit accurately in the interior of the tire shoe, and a member *g* similarly curved, but of larger dimensions, to fit outside of the shoe. These members are connected by a flexible web *h*, while on the unconnected edges of the members *f* and *g* are flaps *i* and *j* respectively.

Preferably the protector is made of the same sort of material as the shoes, to wit, frictioned or rubber-impregnated fabric, with layers of rubber upon or between the layers of fabric. The members *f* and *g* are of unequal thickness, both being thickest at their central portions, and tapering to the ends and side edges, as shown respectively in Figs. 2 and 3. The web *h* and flaps *i* and *j* are preferably single thicknesses of rubber-impregnated fabric. The fabric layers and rubber of which the protector are made are assembled together in the proper form and vulcanized in the ordinary manner.

The manner in which the protector is used is as follows:—In case a blow-out occurs at any part of the shoe, the same is removed from the rim, the member *f* of the protector is inserted in the shoe so as to cover the broken place, the web *h* bent about one of the beads of the shoe, and the member *g* then placed on the outside of the shoe over the hole. The flap *j* is then tucked under the other edge of the shoe and the flap *i* laid outside. The inner shoe is then replaced in the tire inside of the member *f* and the entire shoe with the protector and inner tube in place are again put on the wheel. When the inner tube is inflated the pressure thereof holds the internal member of the protector firmly and solidly against the inside of the shoe, while the outer member of the protector is clasped about the shoe and held by the engagement of the webs, *h*, *i* and *j* with the flanges of the wheel rim. As the flap *j* is placed inside of the flap *i* and entirely covered and surrounded by the latter, and as the frictional qualities of the material are great, the outer member of the protector is securely retained beyond any possibility of the pneumatic pressure to displace it.

The principal members *f* and *g* are made relatively stiff, so that the inner member cannot be forced through the hole or weak place in the shoe, or distorted by pneumatic pressure, while the outer member *g* is stiff and strong enough to prevent working of dirt into the torn place by the pressure on the road. In case the tire shoe receives a rim cut the protector is equally efficient for mending the same and restoring practically its entire strength to the tire. The web *h*, integrally connecting the two members of the protector, entirely surrounds one edge of the tire shoe, while the flaps *i* and *j* provide a double envelop for the opposite edge of the shoe. The entire transverse portion of the tire affected is thus wholly surrounded and enveloped by the members of the protector, and made as strong as when new.

The only satisfactory means at present known of mending the blow-out is by vulcanizing a patch into the tire. My protecting cover performs this result in as effective a manner as vulcanization, at a small fraction of the time and expense required to repair by vulcanization. Hitherto there has been no means of repairing a rim-cut in the tire, because this part of the tire shoe is too thin for patching and vulcanizing. My invention supplies this lack by providing a device equally efficient for mending a rim-cut and reinforcing the tire at the point injured, as for mending a blow-out. The protector is constructed with the end in view of being able to stand as much usage and wear as the original tire, and consequently a shoe mended with my protector is able to stand as hard and prolonged usage as when new and uninjured.

I do not limit myself to the use of flexible fabric as the material from which to make the web *h* connecting the members *f* and *g*, as I reserve the right to employ any other material, whether flexible or not, for this purpose. For instance I may employ a strip of thin sheet metal, as aluminum, shaped to fit accurately around one of the beads of the tire shoe and suitably secured at its edges to the adjacent edges of the inner and outer members, and I therefore declare that I include within the scope of my invention, broadly, any devices or members adapted to lie inside and outside of the same zone of the tire shoe and a connection or flaps of any character whatever to surround the beads of the shoe.

I claim,—

1. A tire protector comprising two relatively stiff members curved on radii corresponding respectively to the inner and outer curved surfaces of a tire shoe, and a flexible web connecting one edge of each member, the free edge of each member being provided with a flexible flap.

2. A tire protector comprising two relatively stiff members shaped to respectively fit inside and outside of a tire shoe, said members being provided with flexible portions to surround the edges of the shoe and overlap within the rim of the wheel.

3. A tire protector comprising an outer member shaped to fit the outside of a tire shoe, an inner member adapted to be placed within the shoe and flexibly connected to one edge of the outer member, and a flap flexibly attached to the opposite edge of the outer member and also adapted to be placed within the shoe.

In testimony whereof I have affixed my signature, in presence of two witnesses.

JOHN O. CALDWELL, Jr.

Witnesses:
ARTHUR H. BROWN,
P. W. PEZZETTI.